US009012090B2

United States Patent
Bae et al.

(10) Patent No.: US 9,012,090 B2
(45) Date of Patent: Apr. 21, 2015

(54) ADVANCED, HIGH POWER AND ENERGY BATTERY ELECTRODE MANUFACTURED BY CO-EXTRUSION PRINTING

(71) Applicant: Palo Alto Research Center Incorporated, Palo Alto, CA (US)

(72) Inventors: Chang-Jun Bae, Mountain View, CA (US); Eric J. Shrader, Belmont, CA (US); Corie Lynn Cobb, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 105 days.

(21) Appl. No.: 13/727,960

(22) Filed: Dec. 27, 2012

(65) Prior Publication Data

US 2014/0186700 A1 Jul. 3, 2014

(51) Int. Cl.
| | |
|---|---|
| *H01M 4/13* | (2010.01) |
| *H01M 4/04* | (2006.01) |
| *B29C 47/06* | (2006.01) |
| *H01M 4/131* | (2010.01) |
| *H01M 4/1391* | (2010.01) |
| *H01M 4/36* | (2006.01) |
| *H01M 4/505* | (2010.01) |
| *H01M 4/525* | (2010.01) |
| *H01M 4/58* | (2010.01) |

(Continued)

(52) U.S. Cl.
CPC ............ *H01M 4/049* (2013.01); *H01M 4/0411* (2013.01); *B29C 47/06* (2013.01); *H01M 4/131* (2013.01); *H01M 4/1391* (2013.01); *H01M 4/366* (2013.01); *H01M 4/505* (2013.01); *H01M 4/525* (2013.01); *H01M 4/5825* (2013.01); *H01M 4/62* (2013.01); *H01M 4/623* (2013.01); *H01M 4/625* (2013.01); *H01M 10/0525* (2013.01); *H01M 2004/021* (2013.01)

(58) Field of Classification Search
CPC . H01M 10/0525; H01M 10/052; H01M 4/13; H01M 4/0404; H01M 4/049; H01M 4/48; H01M 4/0411
USPC ......... 429/211, 221, 223, 224, 231.3, 231.95, 429/246
See application file for complete search history.

(56) References Cited

U.S. PATENT DOCUMENTS

| | | | |
|---|---|---|---|
| 3,195,865 | A | 7/1965 | Harder |
| 3,382,534 | A | 5/1968 | Veazey |

(Continued)

FOREIGN PATENT DOCUMENTS

| | | |
|---|---|---|
| EP | 0802034 | 10/1997 |
| EP | 1757429 | 2/2007 |

(Continued)

OTHER PUBLICATIONS

Fergus et al., "Recent Developments in Cathode Materials for Lithium Ion Batteries," Journal of Power Sources, Elsevier SA, Ch. vo. 195, No. 4, Feb. 15, 2010, pp. 939-954, XP026693512.

(Continued)

*Primary Examiner* — Stewart Fraser
(74) *Attorney, Agent, or Firm* — Marger Johnson & McCollom PC

(57) ABSTRACT

A battery has an anode, a separator adjacent the anode, and a cathode adjacent the separator opposite the anode, the cathode comprising interdigitated stripes of materials, one of the materials forming a pore channel.

6 Claims, 5 Drawing Sheets

(51) Int. Cl.
*H01M 10/0525* (2010.01)
*H01M 4/62* (2006.01)
*H01M 4/02* (2006.01)

(56) References Cited

U.S. PATENT DOCUMENTS

| | | | |
|---|---|---|---|
| 3,583,678 | A | 6/1971 | Harder |
| 3,752,616 | A | 8/1973 | Matsui et al. |
| 3,860,036 | A | 1/1975 | Newman, Jr. |
| 4,511,528 | A | 4/1985 | Kudert et al. |
| 5,094,793 | A | 3/1992 | Schrenk et al. |
| 5,143,681 | A | 9/1992 | Daubenbuchel et al. |
| 5,154,934 | A | 10/1992 | Okamoto |
| 5,628,950 | A | 5/1997 | Schrenk et al. |
| 5,843,385 | A | 12/1998 | Dugan |
| 5,851,562 | A | 12/1998 | Haggard et al. |
| 5,882,694 | A | 3/1999 | Guillemette |
| 6,109,006 | A | 8/2000 | Hutchinson |
| 6,676,835 | B2 | 1/2004 | O'Connor et al. |
| 6,981,552 | B2 | 1/2006 | Reddy et al. |
| 7,090,479 | B2 | 8/2006 | Kegasawa et al. |
| 7,690,908 | B2 | 4/2010 | Guillemette et al. |
| 7,700,019 | B2 | 4/2010 | Lavoie et al. |
| 7,765,949 | B2 | 8/2010 | Fork et al. |
| 7,780,812 | B2 | 8/2010 | Fork et al. |
| 7,799,371 | B2 | 9/2010 | Fork et al. |
| 7,883,670 | B2 | 2/2011 | Tonkovich et al. |
| 7,922,471 | B2 | 4/2011 | Fork et al. |
| 7,988,746 | B2 * | 8/2011 | Chiang et al. ............... 29/623.1 |
| 8,148,009 | B2 * | 4/2012 | Chiang et al. ............... 429/209 |
| 8,168,326 | B2 * | 5/2012 | Chiang et al. ............... 429/209 |
| 8,206,025 | B2 | 6/2012 | Natarajan |
| 8,206,468 | B2 * | 6/2012 | Chiang et al. ............... 29/623.1 |
| 8,206,469 | B2 * | 6/2012 | Chiang et al. ............... 29/623.1 |
| 8,241,789 | B2 * | 8/2012 | Chiang et al. ............... 429/221 |
| 8,277,975 | B2 * | 10/2012 | Chiang et al. ............... 429/209 |
| 8,586,238 | B2 * | 11/2013 | Chiang et al. ............... 429/210 |
| 2002/0074972 | A1 | 6/2002 | Narang et al. |
| 2002/0176538 | A1 | 11/2002 | Wimberger-Friedl et al. |
| 2002/0197535 | A1 * | 12/2002 | Dudley et al. ............... 429/246 |
| 2003/0111762 | A1 | 6/2003 | Floyd et al. |
| 2003/0189758 | A1 | 10/2003 | Baer et al. |
| 2007/0279839 | A1 | 12/2007 | Miller |
| 2010/0003603 | A1 * | 1/2010 | Chiang et al. ............ 429/231.95 |
| 2010/0239700 | A1 | 9/2010 | Winroth |
| 2011/0064999 | A1 * | 3/2011 | Chiang et al. ............... 429/209 |
| 2011/0070489 | A1 * | 3/2011 | Chiang et al. ............... 429/209 |
| 2012/0153211 | A1 | 6/2012 | Fork et al. |
| 2012/0156364 | A1 | 6/2012 | Fork et al. |

FOREIGN PATENT DOCUMENTS

| | | |
|---|---|---|
| EP | 2056352 | 5/2009 |
| EP | 2466594 | 6/2012 |
| FR | 1308573 | 11/1962 |
| JP | 9183147 | 7/1997 |
| JP | 2006326891 | 12/2006 |
| WO | 0121688 | 3/2001 |

OTHER PUBLICATIONS

European Search Report, dated Apr. 14, 2014, EP Application No. 13198599.6, 7 pages.

* cited by examiner

US 9,012,090 B2

ADVANCED, HIGH POWER AND ENERGY BATTERY ELECTRODE MANUFACTURED BY CO-EXTRUSION PRINTING

RELATED APPLICATIONS

The application is related to US Patent Publication No. 20120156364; US Patent Publication No. 20120153211; U.S. patent application Ser. No. 13/727,937; U.S. patent application Ser. No. 13/727,993; and U.S. patent application Ser. No. 13/728,016.

BACKGROUND

Battery electrode design often has to make trade-offs between energy density and power density. Energy density is generally considered to be the amount of energy stored in a given system or region of space per unit mass. Power density is the measure of a material's ability to conduct an electric current. Typically, devices with high energy density, that is, high storage capacity, do not discharge quickly, meaning they do not have high power at the same time.

Strong demand exists for increased volumetric energy density lithium-ion (Li-ion) batteries in power supply applications. The demand arises in several places such as for long-range drivable electric vehicles (EVs), hybrid EVs and cordless electric power tools. Specifically with regard to EVs, the distance over which Li-ion powered EVs may be used is directly related to volumetric energy density. Current Li-ion batteries meet or exceed US Advanced Battery Consortium (USABC) goals for power requirements, but meet only 60% of their recommended targets for volumetric energy density. In order to increase the volumetric density of Li-ion batteries, it is important to reduce the volume of inactive components in Li-ion cells.

FIG. 1 shows a typical Li-ion cell 10, in which the active material consists of lithium-cobalt-oxide ($LiCoO_2$) for the cathode 18 and graphite 20 for the anode part. The inactive components consist of the electrolyte, binder, carbon, separator 14, and positive and negative current collectors 12 and 16. FIG. 2 shows how Li-ion transport occurs through a portion 20 of the liquid electrolyte in FIG. 1 from anode to cathode electrode during discharging. Local depletion of ions in the liquid electrolyte 24 can occur with an electrically conductive, dense electrode. This phenomenon limits the critical current density that can result as the discharge capacity decreases when the current increases further. Thinner electrodes, approximately 100 micrometers, with shorter Li-ion diffusion length 22 have been employed in conventional Li-ion batteries to diminish this effect.

For current EV applications, large batteries are produced by stacking many layers of conventional thin electrodes. This results in a large proportion of inactive components in these batteries. Reducing the amount of expensive separators and heavy current collectors would greatly reduce expense and the amount of inactive materials present. FIG. 4 shows a Li-ion transport path 38 that using thicker electrodes such as 36 provides a direct, practical solution to increase volumetric energy density of Li-ion batteries in a manner that increases the proportion of active material to inactive material. However, FIG. 4 shows an issue with the thicker electrodes such as 36. Because of the longer diffusion paths such as 38, the electrolyte depletion increases due to poor Li-ion conductivity in complex microstructures in the diffusion paths. Current industrial fabrication processes limit the improvements that can be made to electrode architecture.

DETAILED DESCRIPTION OF THE EMBODIMENTS

Figure 1:
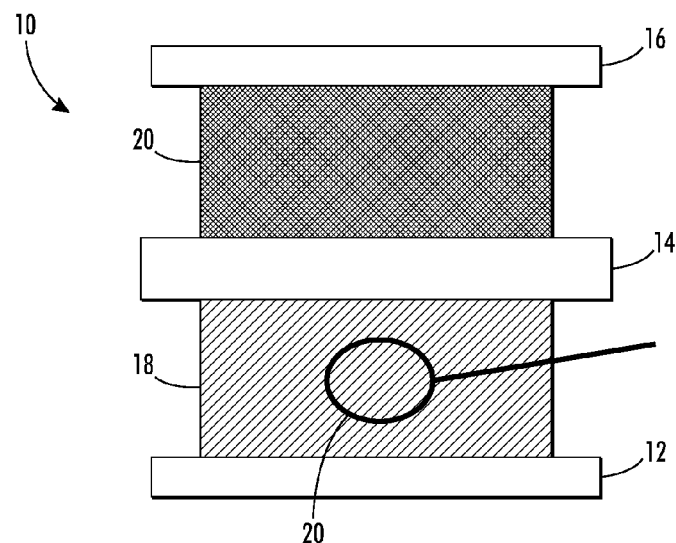
FIGS. 1 and 2 show prior art configurations of conventional lithium ion batteries.
Figure 2:
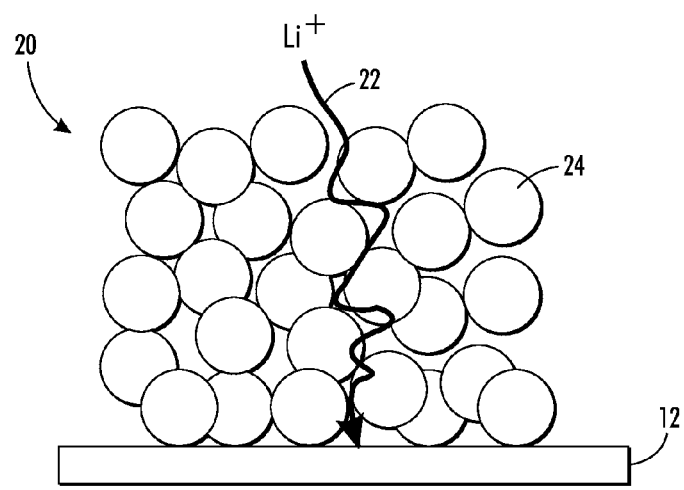
Figure 3:
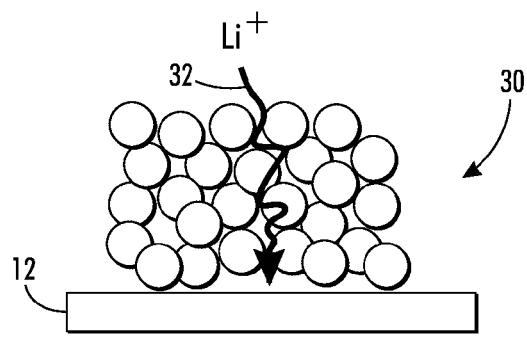
FIGS. 3 and 4 show prior art configuration using thick electrodes to increase volumetric energy density of lithium ion batteries.
Figure 4:
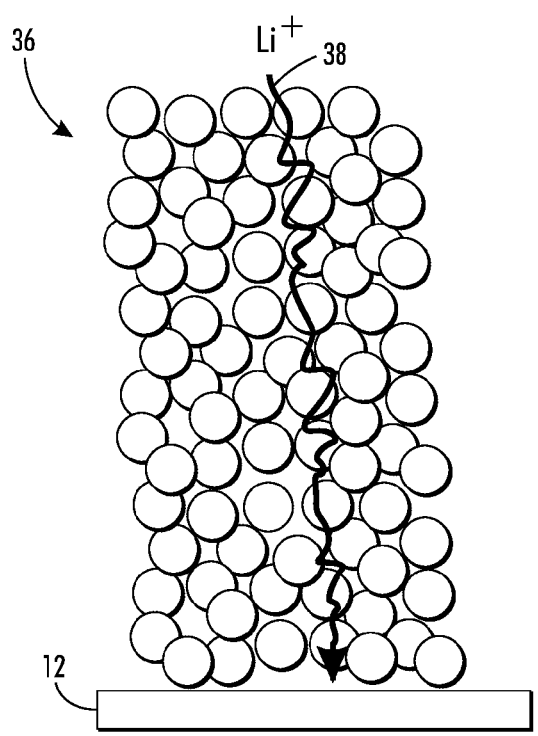
Figure 5:
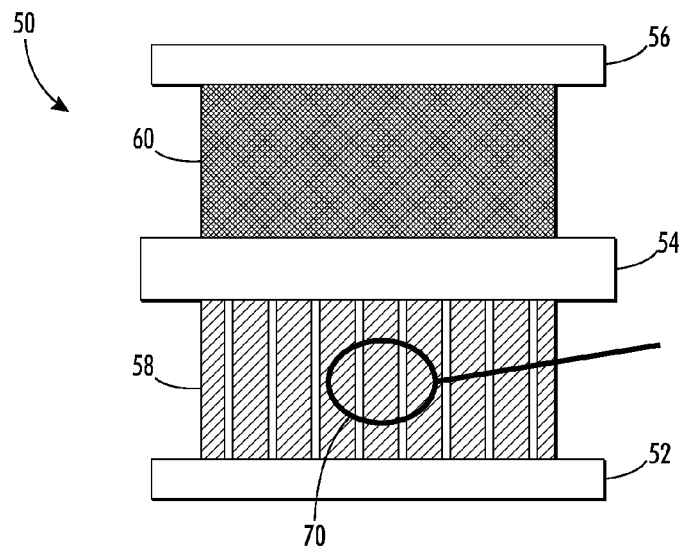
FIG. 5 shows an embodiment of a battery having thick, high energy density electrode with straight pore channels.

FIG. 5 shows an embodiment of a battery having a different type of electrode. The battery 50 has current collectors 52 and 56, a cathode 58, a separator 54 adjacent the cathode and an anode 60 adjacent the anode opposite the cathode. The cathode 54 in this embodiment consists of interdigitated stripes of materials.

Examples of these types of battery electrodes are discussed in U.S. Pat. Nos. 7,765,949; 7,780,812; 7,922,471; and U.S. Patent Publications 20120156364 and 20120153211. U.S. Pat. No. 7,765,949 discloses a device for extruding and dispensing materials on a substrate, the device has at least two channels for receiving materials and an exit port for extruding the materials onto the substrate. U.S. Pat. No. 7,780,812 discloses another such device having a planarized edge surface. U.S. Pat. No. 7,922,471 discloses another such device for extruding materials that have an equilibrium shape that does not settle after deposition onto the substrate. U.S. Patent Publications 20120156364 and 20120153211 disclose a co-extrusion head that combines streams of two or more materials into an interdigitated structure on a substrate, where there are multiple stripes of the materials.

The battery 50 in FIG. 5 has a cathode having interdigitated stripes of materials. These stripes may be formed from the co-extrusion devices, which may also be referred to print heads, disclosed in the above patents and publications. This structure may be formed by other types of devices. Additionally, other types of structures may be formed using the embodiment disclosed here. A battery electrode consists of only one example of the uses for the materials and embodiments disclosed.

Figure 6:
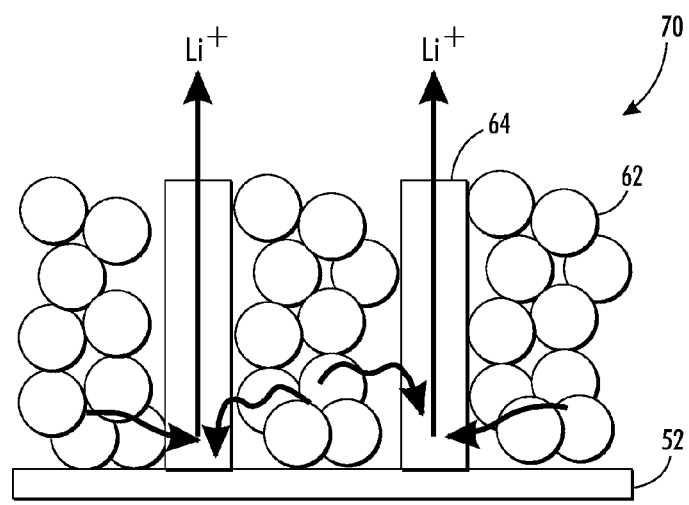
FIG. 6 shows a more detailed view of an embodiment of an electrode with straight pore channels providing fast lithium ion path.

Conventional extrusions methods cannot create conducting contacts and spaced interdigitated strips by feeding multiple viscous, particle-filled pastes into a print head that allows flows of separate fluids to alternately converge. Because of the laminar flow in the above micro co-extrusion print head, the two materials generally do not mix. FIG. 6 shows an exploded view of a portion 70 of the interdigitated structure of FIG. 5.

One of the materials of the interdigitated stripes of materials form a pore channel as a microstructure within the electrode structure. The formation of the stripes and materials used to cause this structure will be discussed in more detail further. The pore channels such as 64 play a critical role as a sink or source to facilitate Li-ion motion. These channels cause shorter and much less tortuous paths when the Li-ions are transferred from the other material 62 through the pore channels. This allows the use of thicker electrodes than would otherwise be possible. The resulting cathodes have high power and volumetric energy density.

Figure 7:
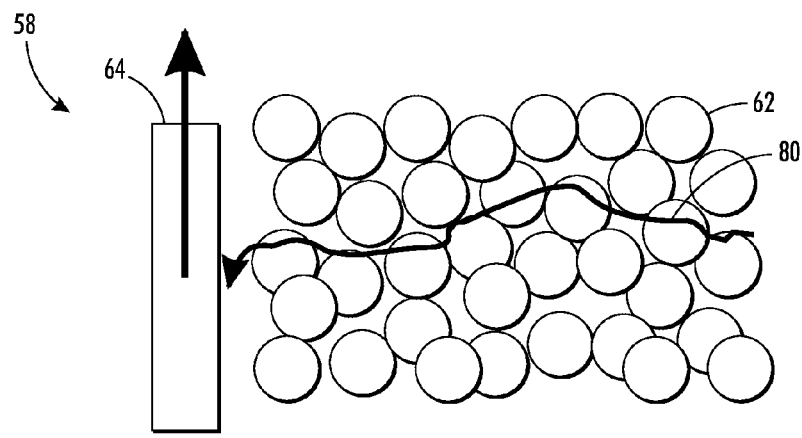
FIGS. 7 and 8 show diffusion paths of an electrode with straight pore channels during charging and discharging processes.
Figure 8:
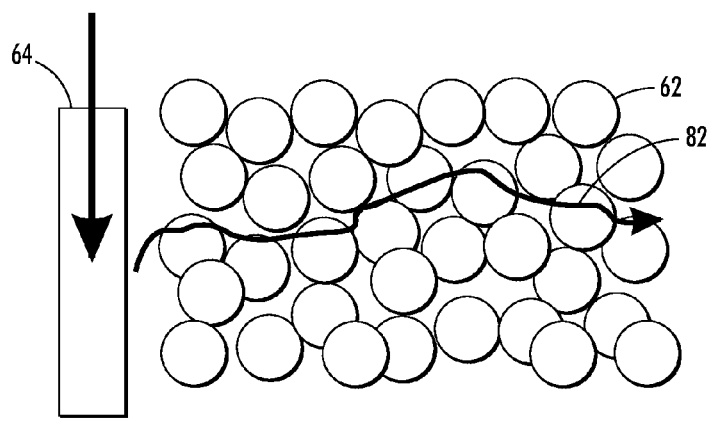

FIGS. 7 and 8 show the diffusion paths for sink and source sites. FIG. 7 shows a diffusion path 80 through the matrix 62 towards the pore channel 64 during the charging process. FIG. 8 shows a diffusion path 82 towards the matrix 62 from the pore channel during a discharging process. The paths to and from the matrix, which is the stripe of other material in the cathode, are shorter and the pore channels allow for very quick diffusion paths.

Figure 9:
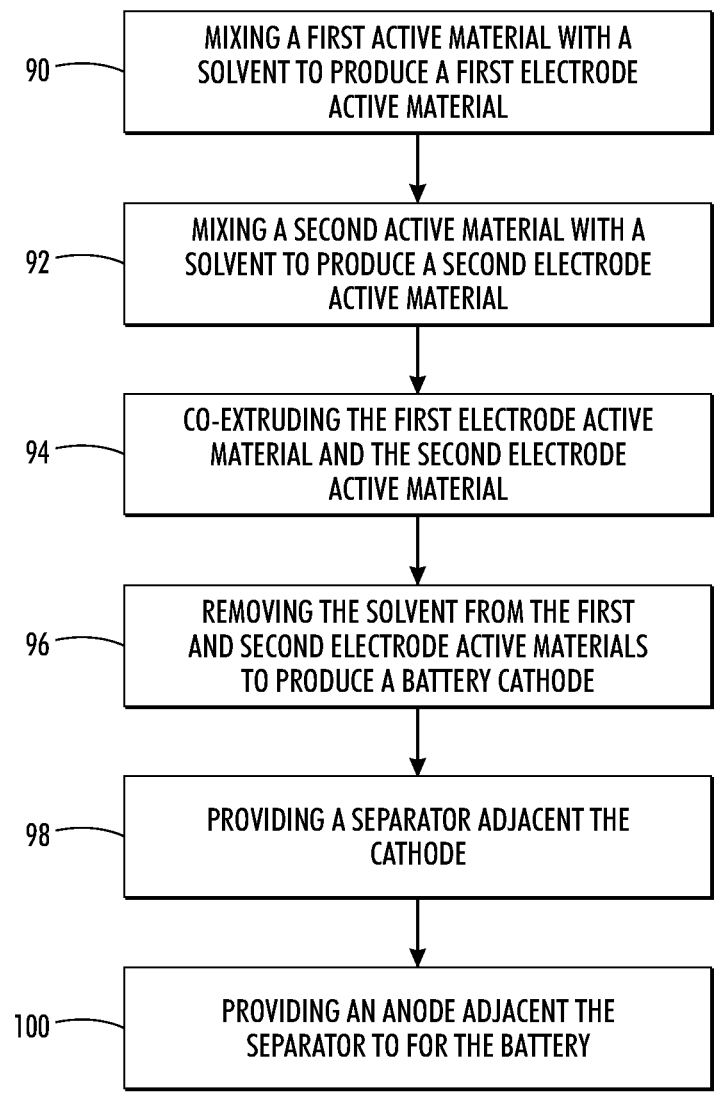
FIG. 9 shows a flowchart of an embodiment of a method to manufacture battery electrodes.

The discussion up to this point has addressed the structures, but now turns to the methods of manufacturing structures such of these. FIG. 9 shows an overall flowchart of an embodiment to manufacture interdigitated electrodes. Generally, the process involves mixing a first active material with a solvent to produce a first electrode active material at 90. The solvent allows the material to be thinned to allow it to flow more easily through the co-extrusion device. The first active material and the second active material may be generally the same material, but of different concentrations. For purposes of this discussion, the first material will be the material having a higher concentration.

The second material is prepared in the same manner at 92. The two active materials are then extruded together at 94 using a co-extrusion device or print head, either the ones discussed above or another type. Once the materials are in place on the substrate, the solvent is removed, leaving the active materials in their respective places on the substrate. The battery is then finished by providing a separator at 98 and an anode at 100.

One of the goals of the process is to provide dispersed particle sizes with interstitial spacing for formation of the pore channel in the stripes of material having a lower concentration of the active material. This process may occur in several different ways. This discussion will address a room-temperature method and a high-temperature process. For a room temperature embodiment, the active cathode materials may consist of lithium cobalt oxide (LCO), lithium nickel cobalt manganese oxide (NCM), or a mixture of the two. Other materials may include lithium nickel cobalt aluminum oxide (NCA), lithium manganese oxide (LMO), lithium iron phosphate (LFeP). While many of the active materials here are lithium, these techniques can be applied to sodium ion batteries and magnesium ion batteries. The anode materials may be graphite and lithium titanate (LTA). In this particular embodiment, the material is mixed with a binder, such as polyvinylidene fluoride (PVDF), and the solvent consists of n-methyl-2-pyrrolidone (NMP). A dispersant in the form of polyoxyethylen oleyl ether, also known as Brij 98, may also be added. Carbon black may be added to increase electrical conductivity.

These materials are formed into two different slurries, where one slurry has an active material with a higher concentration than the other. The co-extrusion device deposits the slurries onto a substrate and then the solvent is removed. In the room temperature embodiment the solvent is dried out of the slurries, leaving the materials in their respective positions.

In a high temperature embodiment, the active material consists of LCO. The binder used in this embodiment is an ethylcellulose resin, such as Ethocel™ manufactured by the Dow Chemical company. The solvent used in this particular embodiment consists of a mixture of diethyl sebacate and butyl carbitol. The dispersant may consists of linolenic acid. The mixtures are deposited and then sintered at high temperature to remove the solvent and leave the materials.

In either case, the resulting materials have a wide distribution of particle sizes in the lower concentration. This allows the formation of the pore channels as microstructures in the electrodes. The resulting electrodes have highly controlled microstructures rendering a fast lithium ion diffusion path, resolving the electrolyte depletion problem so that high energy and power electrodes are fabricated. These electrodes demonstrate much better electrochemical performance than conventional battery electrodes.

In contrast, conventional battery electrodes only possess simple, monolithic microstructures because they are typically fabricated from pastes on current collector foils, the pastes spread using tape casting.

It will be appreciated that several of the above-disclosed and other features and functions, or alternatives thereof, may be desirably combined into many other different systems or applications such as sodium ion battery and magnesium ion battery. Also that various presently unforeseen or unanticipated alternatives, modifications, variations, or improvements therein may be subsequently made by those skilled in the art which are also intended to be encompassed by the following claims.

What is claimed is:

1. A battery, comprising:
    an anode;
    a separator adjacent the anode; and
    a cathode adjacent the separator opposite the anode, the cathode comprising interdigitated stripes of first and second materials, the first material having a lower lithium concentration than the second material, one of the materials forming a pore channel.

2. The battery of claim 1, further comprising current collectors adjacent to the anode and the cathode opposite the separator.

3. The battery of claim 1, wherein the pore channel is formed of the first material.

4. The battery of claim 1, wherein the cathode comprises an active material of either lithium cobalt oxide or lithium nickel cobalt manganese oxide.

5. The battery of claim 1, wherein the cathode comprises an active material of one of: lithium nickel cobalt aluminum oxide (NCA), lithium manganese oxide (LMO), or lithium iron phosphate (LFeP).

6. The battery of claim 1, wherein the anode comprises interdigitated stripes of materials, one of the materials forming a pore channel.

* * * * *